No. 724,803. PATENTED APR. 7, 1903.
W. D. CARSON.
DRAFT ATTACHMENT FOR VEHICLES.
APPLICATION FILED JULY 23, 1902.
NO MODEL.

Witnesses
Alfred A. Eicke
N. B. Irion

Inventor
William D. Carson.
by Higdon & Longan attys.

UNITED STATES PATENT OFFICE.

WILLIAM D. CARSON, OF CENTRALIA, ILLINOIS.

DRAFT ATTACHMENT FOR VEHICLES.

SPECIFICATION forming part of Letters Patent No. 724,803, dated April 7, 1903.

Application filed July 23, 1902. Serial No. 116,722. (No model.)

*To all whom it may concern:*

Be it known that I, WILLIAM D. CARSON, of the city of Centralia, Marion county, State of Illinois, have invented certain new and useful Improvements in Draft Attachments for Vehicles, of which the following is a full, clear, and exact description, reference being had to the accompanying drawings, forming a part hereof.

My invention relates to draft attachments for vehicles; and it consists of the novel construction, combination, and arrangement of parts hereinafter shown, described, and claimed.

The object of my invention is to provide an improved draft attachment which shall obviate the injurious weight heretofore placed upon the horse's neck by the load pulling downwardly upon the hames and collars.

Figure 1:
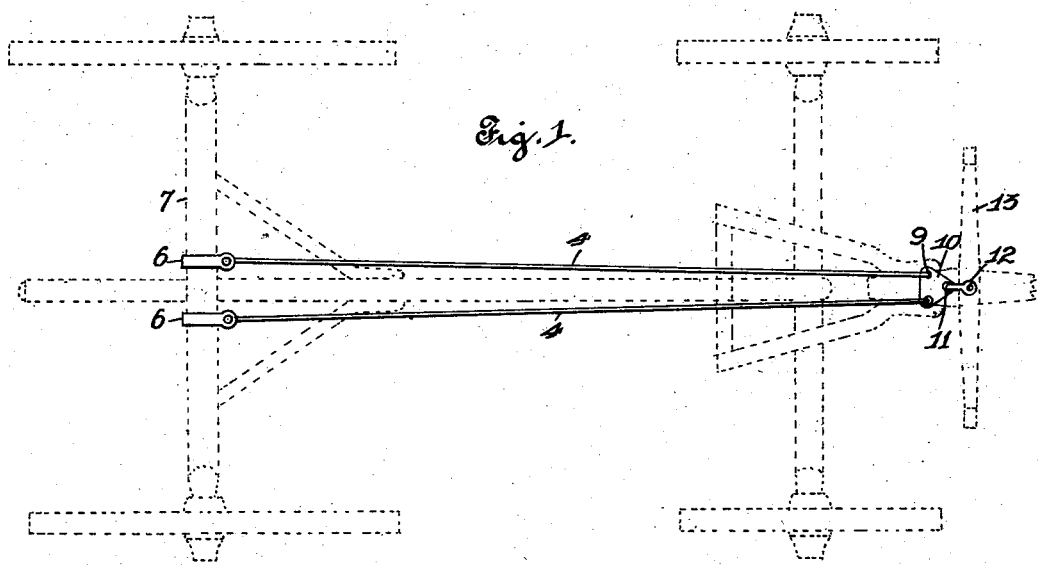
Figure 2:
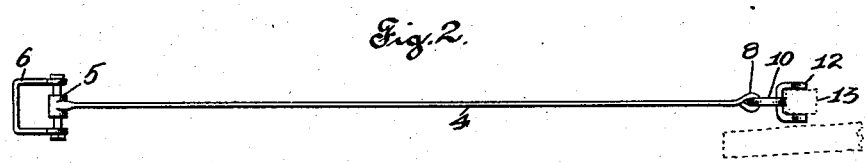
Figure 3:
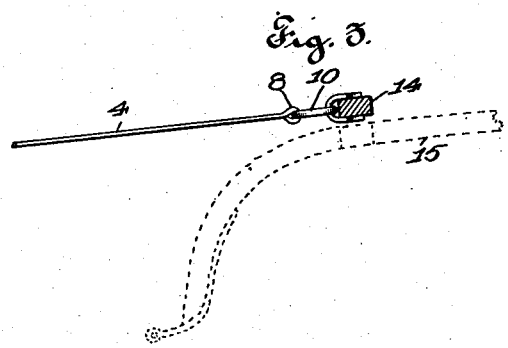

In the drawings, Figure 1 is a plan view of my improved draft attachment applied to a common four-wheeled two-horse vehicle, the vehicle being shown in dotted lines. Fig 2 is a side elevation of my improved attachment. Fig. 3 is a side elevation of a modification, illustrating the manner of applying my invention to one-horse vehicles.

4 indicates a series of metallic draft-rods, the rear ends of which are provided with eyes 5 and connected to common clevises 6, and said clevises are passed over the rear axle 7 at a point about midway of its length. I preferably use two of said draft-rods, although it is obvious that in some cases I may limit the number to one or in some cases to three or more, as circumstances may require. Eyes 8 are formed also upon the forward ends of the said draft-rods 4, and these eyes are made to engage perforations 9 in a triangular equalizing-plate 10, and said plate is also provided with a third aperture 11, in which is mounted a common clevis 12, and the doubletree 13 is pivotally connected to said clevis 12.

It will be observed that the doubletree is not connected in any manner to the tongue or hounds and is therefore free to move independently of the said parts. When draft is applied to the doubletree 13, there will therefore be no draft upon the tongue, but the draft will be in a direct line from the hames carried by the horses to the rear axle 7 without any intervening connection with any other part of the vehicle. The advantage of this construction is that it relieves the horses' necks of the usual weight caused by the "pulling down" of the load, and it also provides a very strong and durable connection.

In the modification shown in Fig. 3, 14 indicates a singletree which has no connection with the shafts 15 and the draft-rods 4 are extended rearwardly in the manner already described and attached to the rear axle.

What I claim is—

1. An improved draft attachment for vehicles, comprising a tree free to move in all directions and to which the draft-animal is to be hitched, a draft-rod extending in a straight line from the rear axle of the vehicle to the said free tree, means for securing the rear end of said straight draft-rod to the rear axle, and means for securing the forward end of said rod to the said tree, substantially as specified.

2. An improved draft attachment for vehicles, comprising a tree free to move in all directions and to which the draft-animal is to be hitched, a series of straight draft-rods 4 having eyes 5 at their rear ends and eyes 8 at their forward ends, clevises 6 adapted to encircle the rear axle and be connected to the said eyes 5, equalizing-plate 10 connected to the eyes 8, and a clevis 12 connected to said equalizing-plate and adapted to be connected to the said free tree, substantially as described.

In testimony whereof I affix my signature in presence of two witnesses.

WILLIAM D. CARSON.

Witnesses:
 ALFRED A. EICKS,
 M. G. IRION.